C. W. PATTEN.
TURN-OVER CARRIAGE-SEAT.

No. 187,304.            Patented Feb. 13, 1877.

Witnesses          Inventor

UNITED STATES PATENT OFFICE.

CHARLES W. PATTEN, OF SALISBURY, MASSACHUSETTS.

IMPROVEMENT IN TURN-OVER CARRIAGE-SEATS.

Specification forming part of Letters Patent No. 187,304, dated February 13, 1877; application filed August 21, 1876.

*To all whom it may concern:*

Be it known that I, CHARLES W. PATTEN, of Salisbury, in the county of Essex and Commonwealth of Massachusetts, have invented a Self-Supporting Turn-Over Carriage-Seat, for use in carriages capable of being converted into one or two seated vehicles, of which the following is a specification:

This invention relates to that class of carriages, open, standing-top, and falling or extension top, which may be adjusted to one or two seats, and arranged for two or four persons. It consists of an upright standard affixed to the base of a carriage-body, having at the top or upper part of said standard, and affixed thereto by a pivot, joint, or hinge, a semi-revolving arm or rest for the support of a carriage-seat; from the under part of said arm or rest drops a stationary brace, the end of which rests in a slot cast, cut, or wrought in said upright standard, thus rendering said arm or rest self-supporting. This arm or rest with seat affixed may be turned over, and the main seat of the carriage thrown or slid over it, concealing it from view, and rendering the carriage a one-seated vehicle.

Figure 1:
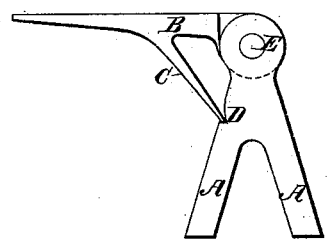

In the drawings, Figure 1, A is the upright standard with the slot D therein made; C, the stationary brace, E, the joint, hinge, or pivot, and B the semi-revolving arm or rest.

Figure 2:
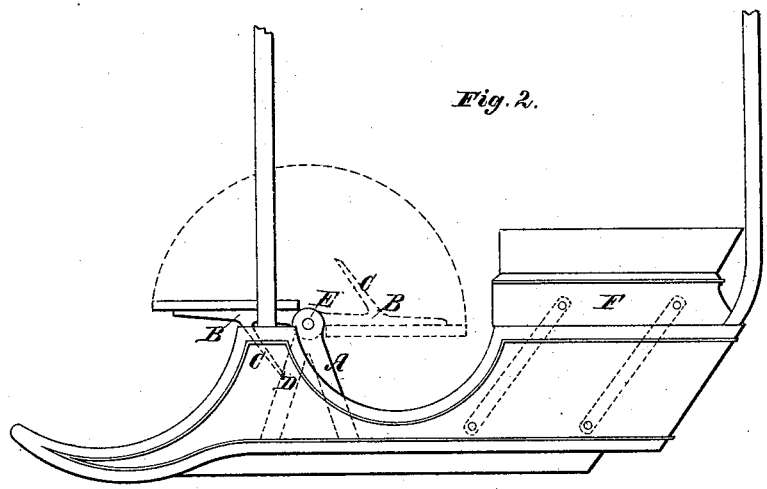

The application is shown by Fig. 2, representing a standing-top carriage with the improvement applied. The solid lines represent a carriage arranged with the improvement, and capable of conveying four persons, the brace C falling inside of the carriage-body, and firmly resting into the slot D. By turning the arm or rest B backward the front of the seat describes an arc, as shown by dotted lines, and falls into the position indicated by dotted lines, and the rear or main seat of the carriage may be brought forward, directly over the inverted seat, thus forming a one-seated carriage for the convenience of two persons.

I claim as my invention—

The combination, with standards secured to the wagon-body, of arms, B, adapted to be fastened to the wagon-seat, said arms provided with rigid braces C, the lower ends of which rest in notches formed in the front edges of the arms B when the seat is in use; the braces C of such length that the rear seat may be shifted over the forward seat without interfering with said braces, all constructed and arranged substantially as and for the purpose set forth.

C. W. PATTEN.

Witnesses:
JOHN F. JOHNSON,
FREDK. B. BYRAM.